Oct. 11, 1966 J. W. HARRISON 3,277,628
METHOD OF PACKAGING
Filed Nov. 27, 1962 2 Sheets-Sheet 1

United States Patent Office 3,277,628
Patented Oct. 11, 1966

3,277,628
METHOD OF PACKAGING
John W. Harrison, Winchester, Mass., assignor to W. R. Grace & Co., Cambridge, Mass., a corporation of Connecticut
Filed Nov. 27, 1962, Ser. No. 241,109
9 Claims. (Cl. 53—30)

This invention relates to methods of packaging with heat shrinkable plastic film, and to the packages produced. The invention further relates to a method of sealing heat shrinkable plastic films, which is used in the above packaging methods.

The use of thin plastic films for providing protective coverings and/or packaging of articles has become quite popular in recent years. However, the methods and materials heretofore used have not been entirely satisfactory for commercial use. The prior practice has generally been to wrap articles in a plastic material which stretches when wet and shrinks when it dries or to dip the articles into a plastic in liquid form to provide a tight covering or package. These prior methods have proved expensive and impractical in many instances in that the resulting covering was not strong enough or tight enough. Some efforts have been made to use plastic materials having heat shrinkable properties, but these materials normally became tacky when heated as they did not have sufficient shrinkability below their plasticizing temperature to provide a tight package or covering. In addition, such heat shrinkable materials had a tendency to lose their tear strength when heated and then cooled and, thus, did not provide a sufficiently strong, tough, tight package.

Irradiated, biaxially stretched polyethylene films have been found to be an excellent overwrap material. The high shrink energy of such film which is advantageous for many purposes causes certain wrapping problems. In particular, the shrink energy possessed by these films creates problems with regard to the sealing of multi-layer overwrap areas and the sealing of these areas while at the same time effecting a "tight" fit between product and film. The instant invention is concerned with these problems as well as with the general problem of packaging articles in shrinkable plastic films.

More specifically, in using high shrink energy polyethylene films of the type described in Baird et al., U.S. Patent 3,022,543, as an overwrap material, it has been found: (a) that it is virtually impossible to effect a satisfactory seal with such film when using an ordinary hot plate; (b) that the multi-layer overwrap areas of high shrink energy film will separate and not seal if some prior art techniques are used; (c) while if other prior art techniques are used, rupture of any sealing achieved occurs before a final seal can be made; and (d) that the prior art methods do not yield a non-wrinkled overwrap area.

An object of the present invention is to provide a method for effectively sealing overlapped areas of heat-shrinkable plastic film.

It is another object of the invention to provide a method of packaging a plurality of articles in a continuous strip of plastic film in which each article is in a sealed pocket spaced apart from and individually separable from the sealed pockets containing other articles.

Yet another object of this invention is to provide a package for a plurality of articles which is in the form of a continuous strip of plastic film, in which strip each article is in a sealed pocket spaced apart from and individually separable from the sealed pockets containing the other articles.

Other objects will be apparent in view of the following more detailed disclosure made with reference to the accompanying drawings in which.

Figure 3:
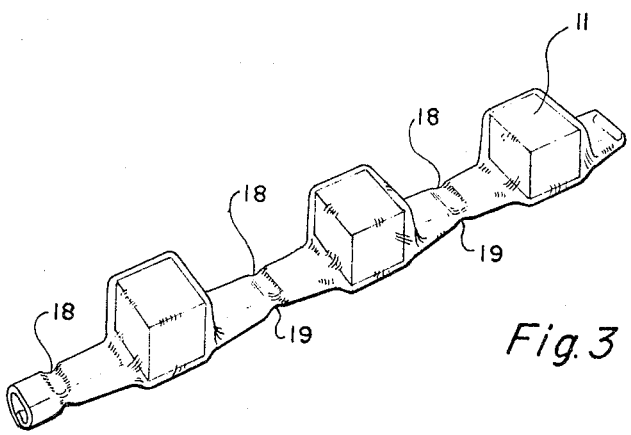
FIGURE 3 is a perspective view of a finished package made in accordance with the invention.
Figure 4:
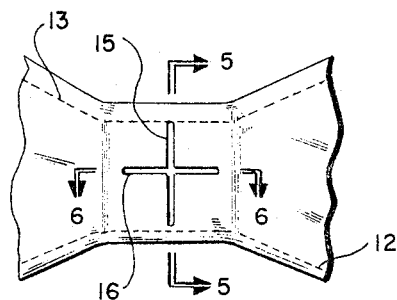
Figure 5:
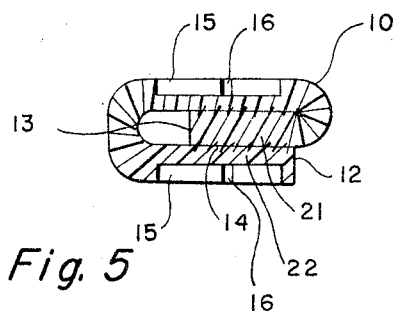
Figure 6:
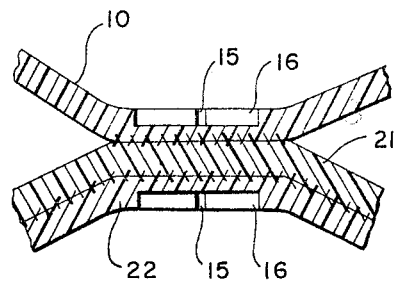

FIGURE 4 is a greatly magnified plan view of a preferred embodiment of the sealed portion of the finished package shown in FIGURE 3; and FIGURES 5 and 6 are cross-sections of the preferred sealed portion, taken on lines 5—5 and 6—6 of FIGURE 4.

In the practice of the invention, the preferred heat shrinkable plastic film is an irradiated, biaxially oriented polyethylene film having a shrink energy of at least about 150 pounds per square inch at 96° centigrade in each of the longitudinal and transverse directions, and prepared by irradiating a film of Alathon 14 (a high pressure, branched-chain polyethylene having a molecular weight of about 20,000 and a density of about 0.916) to a dosage of 12 megarad and biaxially orienting by stretching about 350% in both directions.

In general there is employed in the invention polyethylene film or tubing which has been irradiated to an extent of 2 to 100 megarad, preferably 6 to 20 megarad. The irradiation can be accomplished in conventional fashion, e.g., by the use of a high voltage resonant transformer, such as the 2,000,000 volt General Electric resonant transformer, or high energy particle generators of 50,000 to 50,000,000 volts or a Van de Graaf electron generator.

In addition to the use of electrons for irradiating the polyethylene, there can be employed any of the irradiation procedures disclosed in Baird et al., U.S. Patent 3,022,543, or Rainer et al., U.S. Patent 2,877,500. The disclosures of the Baird et al. and Rainer et al. patents are hereby incorporated by reference.

If the film is biaxially oriented it can normally be carried out to an extent of 100 to 700% longitudinally and 100 to 900% laterally. The biaxial stretching can be carried out by trapping a bubble of air within heated, irradiated polyethylene tubing as disclosed in the Baird et al. patent. The biaxially oriented polyethylene prepared by such a procedure has a high shrink energy, e.g., 100 to 500 p.s.i. at 96° centigrade. It will be obvious to those skilled in the art that if it is desired to monoaxially orient the film, it can be done either laterally or longitudinally of the film.

There can be employed as a starting polyethylene for the irradiation procedure high, low, or medium density polyethylene prepared by low or high pressure technique. The starting polyethylene can have a molecular weight of 7,000 or 12,000 or 14,000 or 21,000 or 35,000 or even higher.

In place of the irradiated polyethylene, there can be employed irradiated or non-irradiated polypropylene. The polyethylene or polypropylene films must in either case be monoaxially or biaxially oriented.

Heat shrinkable films of other materials, e.g., polyvinyl chloride, may also be employed in the practice of the instant invention.

Figure 1:
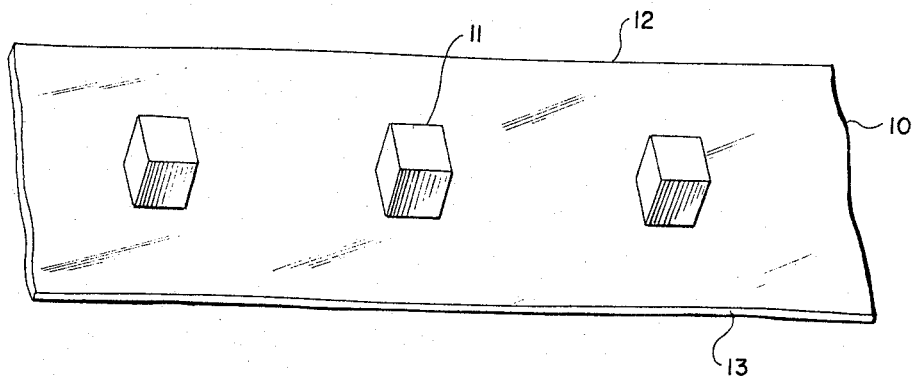
FIGURE 1 is a perspective view showing a plurality of articles placed on a sheet of heat shrinkable plastic film.
Figure 2:
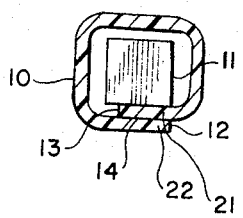
FIGURE 2 is an end view showing an intermediate step in the formation of the package.

FIGURE 1 shows a sheet of heat shrinkable plastic film 10 upon which a plurality of articles 11 (e.g., electric cable connectors) have been placed in spaced apart linear fashion. The film is of sufficient length to extend beyond the articles at each end to provide a spacing of at least about one-half inch between articles after the film is heat shrunk. The film width is sufficient to permit overlapping of edges 12 and 13 for a distance at least equal to about the width of article 11. As most readily seen in FIGURE 2 the film edges 12 and 13 are overlapped (as shown at 14) and the tube so formed is turned over so that the articles 11 therein rest upon the overlap.

The entire tube is then heat shrunk without restraint. The film will draw together at the ends and between the respective articles until the package has the general configuration illustrated in FIGURE 3. The heat for shrinking is preferably supplied by a source of hot air, e.g., a hot air blower or oven. Other heat sources such as radiant heaters, etc. could be used if desired. The film is heated until the free portions thereof are shrunk to about their original dimensions, i.e., the dimensions of the original film prior to biaxial stretching.

The ends of the tube and the areas between the spaced articles are then sealed by pressing them together while the shrunk film is still hot. The areas may be pressed from the top only (as shown at 18 in FIGURE 3) or from the top and bottom (as shown at 18 and 19, FIGURE 3). In either case, a very strong transverse seal is formed almost instantaneously. Because the film in these areas has been been shrunk to approximately the original dimensions the transverse seal formed is under essentially no strain and thus is permanent, i.e., does not rupture or separate even though pressure is released almost immediately. Furthermore, the transverse seal area is completely free of wrinkles, folds, etc., thus presenting a very pleasing appearance.

The package produced by the present invention is particularly suitable for wrapping articles which are inspected and handled by purchasers and which are easily bruised by handling. This package makes it possible to store or display products vertically by hanging the package from a suitable support thereby taking up less floor space, or the package may be wound about a reel so that the product could be dispensed from a roll. Any desired number of articles may be separated from the package merely by cutting between the articles in the region of reduced film diameter.

If it is desired to permit separation of individual articles from the strip package without use of a cutting tool, the transverse seal area may be provided with a tear line. This can be accomplished by using a presser bar or bars which cut partially into the seal area on one or preferably on both sides as the sealing takes place. Such a sealed area is illustrated in FIGURES 4, 5 and 6. The plan view in FIGURE 4 shows cut lines 15 and 16 which preferably cross each other as illustrated. In the preferred embodiment illustrated in FIGURES 5 and 6, the cuts are made partially into both sides (i.e., the top and the bottom) of the transverse seal. In the method described with reference to FIGURES 1 to 3, the transverse cross-section of the seal will be like that shown in FIGURE 5 and the longitudinal cross section like that shown in FIGURE 6. As illustrated in each figure, all three layers of the film (i.e., the top main portion 10 and the overlapped bottom portions 21 and 22) are permanently sealed together. By providing the partial cuts 15 and 16, an article can be separated from the remainder of the strip by simply grasping the strip on each side of the seal and twisting, thus, subjecting the film to a shearing action which severs the seal along the line of the partial cuts.

In the package described the pressure of articles 11 on the overlapped film edges 12 and 13 and the effect of the shrinking action will form a tight longitudinal seal. It is not necessary to otherwise fasten or seal the overlapped film edges. If desired, the longitudinal seal area could be held closed during the heating period by accessory equipment such as a chain link belt so as to form a tight seal without turning the tube over to rest enclosed articles on the longitudinal overlap, as previously described. Thus each individual article is wholly in a moisture-proof, dust-proof, protective wrap which is integrally connected to but readily separable from the wrap around other individual articles in the strip package.

Those skilled in the art will quickly recognize that the transverse sealing method described above is equally adaptable for use with seamless tubes or bags composed of heat-shrinkable plastic film. Thus a vacuumized package can be prepared by placing a suitable product in a bag of heat shrinkable film, placing the open end of the bag around a vacuum nozzle, drawing a vacuum on the package interior while at the same time heat shrinking the bag opening into a neck around the nozzle, and then pressing the hot, shrunk neck portions together as the nozzle is withdrawn from the neck. Preferably the remainder of the package film would be shrunk after sealing the hot shrunk neck, but both could be shrunk simultaneously if desired. In either case, a permanent wrinkle-free seal will be formed. This seal may be provided with partial cuts as illustrated in FIGURES 4, 5 and 6 to permit rapid, easy opening of the package. Further, if desired, the pressing device which seals the hot, shrunk neck portions together could be made with a chisel or wedge point to cut entirely through and separate the film, leaving a seal at one or both of the severed ends.

The invention is further illustrated by the following non-limiting example.

A group of seven individual units (which as a group comprised a kit for connecting #1 electrical cable) were placed on about 7-inch centers at about the median line of a 10-inch wide, 4-feet long sheet of irradiated biaxially oriented polyethylene film. The film sides were overlapped 180° (solely to provide extra thickness to compensate for the heavy weight and sharp corners of the articles) and the thus-formed tube was rolled over so that the articles rested on the overlap. Hot air was applied from a hand blower to the top and sides of the film to thoroughly shrink the same. As shrinking progressed the articles drew together so that about one inch of thickened shrunk film remained in the space between the articles. While the film was still hot, the transverse portions at the ends and between the articles was pressed flat by manually pressing a ¼-inch wide pressing bar thereupon. Examination of the transverse seal areas showed that all three individual layers of film were securely welded together. The longitudinal seal, resulting from the weight of the articles on the overlap and the binding effect of the film shrinking, was also found to be quite good.

Individual articles could be readily separated from the strip package by cutting through the middle of the ¼-inch wide transverse seal area.

I claim:

1. Method of sealing together adjacent layers of heat shrinkable plastic film comprising thoroughly heat shrinking said layers and, then, while the shrunken layers are still hot, pressing them together.

2. In the method of packaging an article in a tube of heat shrinkable plastic film comprising placing said article in said tube, sealing the ends of said tube and shrinking the film tightly about said article the improvement in sealing which comprises thoroughly shrinking said tube ends and then pressing together the hot, shrunk neck portion thereby formed, whereby a wrinkle-free, permanent seal is obtained.

3. Improvement as described in claim 2 including the step of cutting partially through at least one layer of film in the area to be sealed simultaneously with the pressing together to form the seal.

4. In the method of packaging an article in a bag of heat-shrinkable plastic film comprising placing said article in said bag, sealing the open end of the bag and shrinking the film tightly about said article the improvement in sealing which comprises thoroughly shrinking the open end of the bag and then pressing together the hot, shrunk neck portion thereby formed, whereby a wrinkle-free, permanent seal is obtained.

5. Improvement as described in claim 4 including the step of cutting partially through at least one layer of film in the area to be sealed simultaneously with the pressing together to form the seal.

6. Method of packaging comprising placing a plurality of articles in spaced-apart linear relationship at about the median line of a sheet of heat shrinkable plastic film; overlapping the side edges of said sheet to form a loose-fitting tubular enclosure about said articles; turning said tubular enclosure over so that said articles rest upon the said overlapped side edges; thoroughly shrinking said film; and then, while said shrunken film is still hot, pressing together the film layers at the ends of the package and between the articles.

7. Method as described in claim 6 wherein said heat shrinkable plastic film is an irradiated biaxially oriented polyethylene film.

8. Method of claim 6 including the further step of cutting partially through at least one of the outermost film layers in the area to be sealed simultaneously with the pressing together of the film layers.

9. Method of claim 8 wherein both of the outermost film layers are partially cut.

References Cited by the Examiner
UNITED STATES PATENTS

| | | | |
|---|---|---|---|
| 2,600,216 | 6/1952 | Denison | 206—47 |
| 2,755,922 | 7/1956 | Volckening | 206—56 |
| 2,783,599 | 3/1957 | Weikert | 53—30 |
| 2,956,886 | 10/1960 | Baush | 229—5 |
| 2,977,729 | 4/1961 | Frechtman et al. | 53—37 X |
| 2,980,245 | 4/1961 | Stoker | 53—30 |
| 3,005,542 | 10/1961 | Harrison | 53—30 |
| 3,041,801 | 7/1962 | Harrison | 53—37 |
| 3,047,140 | 7/1962 | Robins | 206—56 |
| 3,126,682 | 3/1964 | Krance | 53—30 |

FRANK E. BAILEY, *Primary Examiner.*

EARLE DRUMMOND, *Examiner.*

L. G. MANCENE, P. H. POHL, *Assistant Examiners.*